United States Patent [19]

Häuslein

[11] 3,861,975

[45] Jan. 21, 1975

[54] FILTERING DEVICE AND PROCESS OF MANUFACTURING THE SAME

[75] Inventor: Reinhard Häuslein, Minden, Germany

[73] Assignee: Melitta-Werke Bentz & Sohn, Minden/Westfalen, Germany

[22] Filed: May 1, 1973

[21] Appl. No.: 355,988

[30] Foreign Application Priority Data
May 4, 1972   Germany............................ 2221831

[52] U.S. Cl.................. 156/217, 156/227, 156/256, 210/455, 210/474, 210/489, 210/492, 210/497
[51] Int. Cl.............................................. B20d 23/10
[58] Field of Search .......... 210/464, 469, 474, 484, 210/497, 455, 489, 492; 99/295, 306; 426/82, 217, 227; 156/250, 256; 93/36.05; 229/1.5 B

[56] References Cited
UNITED STATES PATENTS

| | | | |
|---|---|---|---|
| 752,019 | 5/1903 | Adwen............................... | 210/474 |
| 2,154,003 | 4/1939 | Lane ................................. | 229/1.5 B |
| 2,171,484 | 8/1939 | Squire................................. | 210/497 |
| 2,234,397 | 3/1941 | Bentz................................. | 210/497 |
| 2,276,318 | 3/1942 | Labombarde...................... | 93/36.05 |
| 3,444,791 | 5/1969 | Honsel............................... | 210/497 |
| 3,567,033 | 3/1971 | Whelan.............................. | 210/497 |

*Primary Examiner*—Charles N. Hart
*Assistant Examiner*—F. F. Calvetti
*Attorney, Agent, or Firm*—Michael S. Striker

[57] ABSTRACT

A filtering device including a filter receptacle and a filter element, the inner supporting faces of said filter receptacle and the outer supported faces of said filter element having the shape of identical equilateral triangles forming a pyramid having a quadratic cross-section. Blanks for forming filter elements of the above set forth type consisting of one-piece blanks of filter material composed of four equilateral triangles of identical size. Finally, processes of producing filter elements by first forming rows of blanks and then folding such blanks into pyramid-shaped filter elements and securing the free edges of the folded blanks to each other so as to maintain the filter elements in finished folded condition.

10 Claims, 9 Drawing Figures

PATENTED JAN 21 1975  3,861,975

FILTERING DEVICE AND PROCESS OF MANUFACTURING THE SAME

BACKGROUND OF THE INVENTION

The present invention relates to filtering devices for the production of aromatic extracts particularly from coffee or tea infusion, blanks from which such filter elements are made and processes for producing from such blanks filter elements for filtering devices. Filtering devices of generally known type which are used for the production of hot beverages have generally the shape of an inverted cone with a substantially circular cross-section. The disadvantages of such filtering elements and the known methods of producing the same are numerous: First of all, filter elements of known type are generally stamped from a continuous sheet of filter material. Since the known filtering elements are of conical shape, there is no possibility of producing them without substantial waste, usually on the order of 20% to 30% of the filter material — i.e., the filter paper. While the thus wasted paper may be recycled for reuse, the process is time-consuming and expensive.

Furthermore, the production of conical filter elements requires usually the provision of two seams inclined in relation to each other; such seams are difficult to produce.

A still further disadvantage of conical filters is that they have the tendency to tear along the seams if the conicity at the apex differs from the conicity along the remainder of the seam.

Finally, it is usually rather difficult to produce conical filter elements of identical shape which, of course, renders use of the filter elements rather difficult.

SUMMARY OF THE INVENTION

It is therefore one of the objects of the present invention to provide improved filtering devices which can be easily manufactured.

A further object of the present invention is a filtering device which is reliable during use.

With the above objects in view, the new filtering device according to the present invention mainly consists in a filter receptacle and a filter element insertable in the aforesaid filter receptacle. In this device the inner supporting faces of the filter recaptacle and the outer supported faces of the filter element have the shape of identical equilateral triangles forming a pyramid having a quadratic cross-section. In such a pyramid the mutually opposing sides — namely, the mutually opposing faces of both the filter receptacle and the filter element — include an angle of approximately 71° with each other.

Furthermore, in accordance with the present invention the filter elements are manufactured by use of filter element blanks having each the shape of two rhombuses joined along a line of symmetry, wherein the sides of the rhombuses meeting in said line of symmetry form an angle of 120° with each other.

According to the present invention the filter elements are manufactured from a strip-shaped portion of filter material having parallel longitudinal edges and a center line equidistant from these edges by first cutting the strip along a series of equidistant parallel V-shaped cutting lines with the apexes of the aforesaid V-shaped cutting lines located in the center line and each of these cutting lines forming an actue angle of 60° with the center line of the strip; these cutting lines are spaced from each other in a longitudinal direction of the strip portion at a distance which is at least equal to the length of each of the cutting lines from the center line to one of the edges of the strip-shaped portion; thereafter each of the blanks obtained by the aforesaid cutting process is then folded into a pyramid-shaped filter element and the free edges of this blank are secured to each other so as to maintain the filter element in finished folded condition.

The novel features which are considered as characteristic for the invention are set forth in the appended claims. The invention itself, however, both as to its construction and its method of operation together with additional objects and advantages thereof will be best understood from the following description of specific embodiments when read in connection with the accompanying drawings.

DESCRIPTION OF THE PREFERRED EMBODIMENTS

Each of these filter receptacles includes a pyramid-shaped filter holder 1 composed of four equal holding panels 1', 1'', 1''' and 1'''', each having the shape of an equilateral triangle. The panels 1' and 1''', and the panels 1'' and 1'''', respectively include an angle of approximately 71° with each other. This holding receptacle 1 is open at its bottom 20 and has on its inner face ridges 21 in order to maintain the filter element at a certain distance from the inner surface of the holding receptacle.

Figure 1:
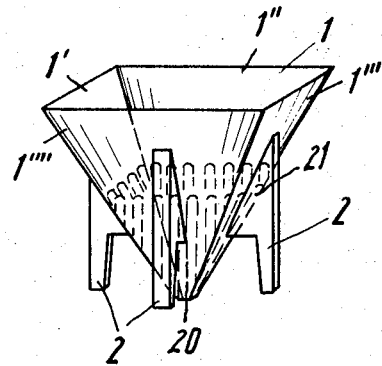
FIGS. 1 to 3 are perspective views of three different embodiments of filter receptacles according to the present invention.
Figure 2:
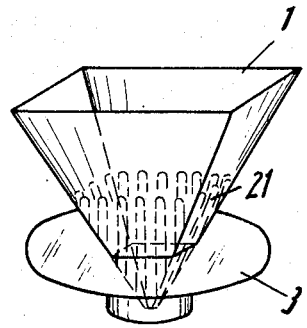
Figure 3:
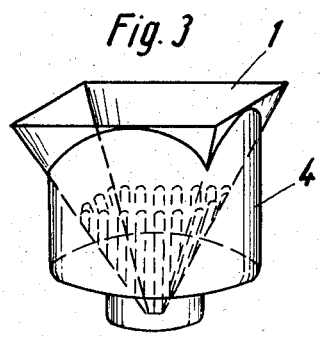

In the embodiment shown in FIG. 1 the filter receptacle is supported by supporting legs 2 while in the embodiment shown in FIG. 2 it is supported by a supporting collar 3; in the embodiment of FIG. 3 a cylindrical jacket 4 serves as support for the holding receptacle 1.

Figure 4:
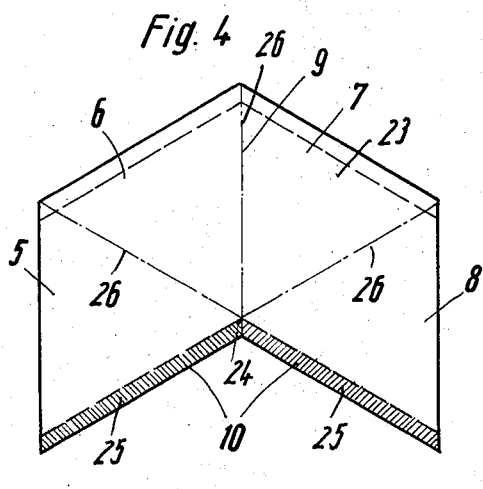
FIG. 4 discloses a filter element blank for making filter elements of the type disclosed in FIGS. 1 to 3.

FIG. 4 discloses a one-piece filter element blank having the shape of two rhombuses — namely, the rhombus 22 composed of the two triangles 5 and 6, and the rhombus 23 composed of the two triangles 7 and 8. This blank has a center line 9 indicated in dash-dotted lines.

The four triangles 5, 6, 7 and 8 are arranged so that a corner of each triangle meets corresponding corners of the other triangles at one point — namely, at point 24, so that the blank has two free edges 25 forming an angle of 120° with each other.

Along these edges are arranged sealing strips 10 which are integral with the blank. Of course instead of two sealing strips it is possible to arrange only one sealing strip.

Figure 5:
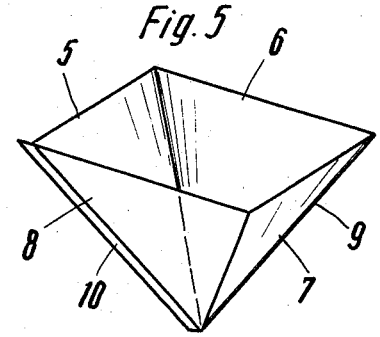
FIG. 5 is a perspective view of a filter element according to the present invention.

FIG. 5 shows a filter element folded from the blank shown in FIG. 4 by folding this blank along the lines 26 into the shape shown in FIG. 5. After folding the sealing strips 10 are secured to each other as shown in this figure so as to maintain the filter element in its finished folded condition.

If only one sealing strip is used, then this strip is folded on the adjacent filter panel and secured thereto.

It is, of course, also possible to secure the abutting free edges of the filter panels 5 and 8 to each other without the provision of any integral sealing strip. Thus, for instance, a separate sealing strip can be secured to the meeting panels along their meeting edges securing them to each other, or it is possible to glue the panels directly to each other along the meeting edges without the provision of any sealing strips.

Figure 6:
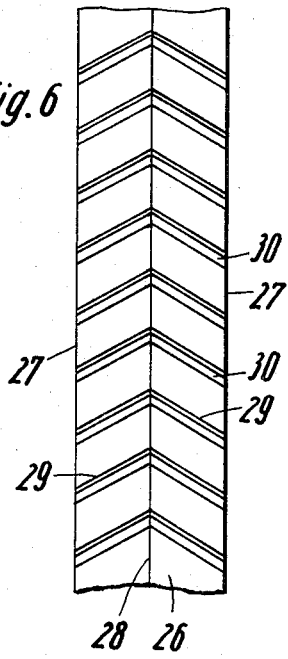

In FIG. 6 a filter strip portion 26 is shown, from which filter blanks of the type shown in FIG. 4 are manufactured. This filter strip portion has parallel edges 27 and a center line 28 located equidistant from these edges. By well known means this filter strip portion is cut along the V-shaped cutting lines 29. These V-shaped cutting lines have apexes located in the center line 28, and each cutting line forms with this center line an acute angle of 60°. The distance between consecutive cutting lines is in this embodiment slightly greater than the length of each of the cutting lines from the center line to the corresponding edge so as to form sealing strip portions 30 along one edge of each blank.

It is evident from FIG. 6 that this strip can be cut into a row of blanks without any waste of paper.

Figure 7:
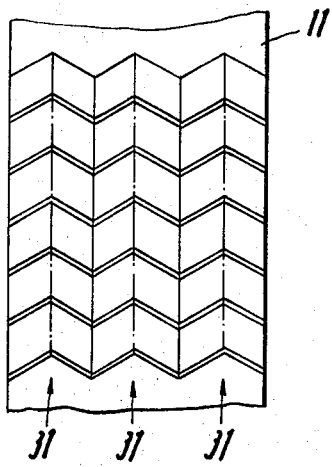
FIGS. 6 to 9 disclose sheets of filter material indicating different arrangements of the filter element blanks to be manufactured from such sheets without any waste of sheet material.

FIG. 7 discloses a sheet of paper 11 composed of a plurality of strip-shaped sheet portions 31 having each the appearance of the strip portion shown in FIG. 6.

Figure 8:
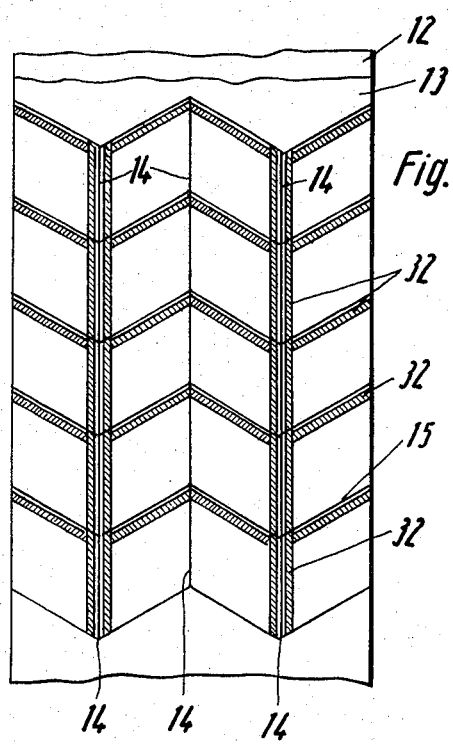

In the embodiment shown in FIG. 8 the filter element blanks are manufactured from two superimposed sheets 12 and 13 by cutting these sheets along all cutting lines indicated in full lines — namely, the continuous cutting lines 14 and the diagonal cutting lines 15. In this manner pairs of superimposed rhombus-shaped blanks are obtained which are secured to each other along the sealing strips 32 forming, after folding along the lines designated by 33, filter elements of the type shown in FIG. 5.

Figure 9:
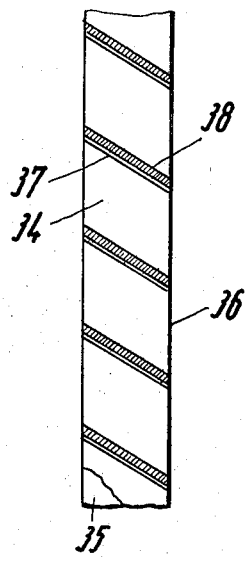

Finally, in FIG. 9 a folded strip is shown which consists of two superimposed strip portions 34 and 35 integral with each other along the edge 36. The folded strip is cut along the diagonal lines 37 and the thus obtained blanks are secured to each other along the sealing strips 38 forming again finished filter elements of the type disclosed in FIG. 5.

The securing of the filter strips to each other or to an adjacent panel can be carried out either by gluing or by embossing or in any other well known manner.

It will be understood that each of the elements described above, or two or more together, may also find a useful application in other types of filtering devices differing from the types described above.

While the invention has been illustrated and described as embodied in filtering devices for beverages, it is not intended to be limited to the details shown, since various modifications and structural changes may be made without departing in any way from the spirit of the present invention.

Without further analysis, the foregoing will so fully reveal the gist of the present invention that others can be applying current knowledge readily adapt it for various applications without omitting features that, from the standpoint of prior art, fairly constitute essential characteristics of the generic or specific aspects of this invention and, therefore, such adaptations should are are intended to be comprehended within the meaning and range of equivalence of the following claims.

What is claimed as new and desired to be protected by Letters Patent is set forth in the appended claims:

1. A process for producing filter elements from a strip of filter material having parallel longitudinal edges and a center line equidistant from said edges, comprising the steps of cutting said strip along a series of equidistant parallel V-shaped cutting lines with the apexes of said V-shaped cutting lines located in said center line and each of said cutting lines forming an acute angle of 60° with said center line of said strip, the distances between said cutting lines in longitudinal direction of said strip portion being at least equal to the length of each of said cutting lines from said center line to one of said edges of said strip-shaped portion; folding each of the thus obtained blanks into a pyramid-shaped filter element, and securing the free edges of each of said blanks to each other so as to maintain said filter elements in folded condition.

2. A process for producing filter elements according to claim 1, wherein the distances between said cutting lines in longitudinal direction of said strip are greater than the length of each of said cutting lines from said center line to one of said edges of said strip so as to form sealing strips along said edges and wherein after the folding of each blank said sealing strips are secured to each other so as to maintain the thus obtained filter element in folded condition.

3. A filtering device comprising, in combination, a filter receptacle; and a filter element produced from a filter blank and being insertable in said filter receptacle, said filter receptacle having inner supporting faces and said filter element having outer supported faces, all of said faces having the shape of identical equilateral triangles, said inner supporting faces together forming a pyramid having an apex and a quadratic cross-section and said outer supported faces together forming a similar pyramid, so that mutually opposing faces of both said filter receptacle and said filter element include an angle of approximately 71° with each other, said filter element blank having the shape of two rhombuses joined along a line of symmetry wherein the sides of the rhombuses meeting in said line of symmetry form an angle of 120° with each other.

4. A filter element according to claim 3, wherein opposing panels of said filter element include an angle of approximately 71° with each other.

5. A one-piece filter element blank according to claim 3, having along at least one of its edges a sealing strip adapted to be secured after folding of said blank to the corresponding filter element.

6. A one-piece filter element blank according to claim 3, having along two edges sealing strips adapted to be secured to each other after folding of said blank into a filter element so as to maintain said filter element in folded condition.

7. A one-piece filter element blank consisting of filter material and composed of four equilateral triangles of identical size, with a corner of each triangle meeting at one point so that said blank has two free edges meeting at said point and forming an angle of 120° with each other.

8. A one-piece filter element blank according to claim 7, provided with a sealing strip integral with said blank along at least one of said free edges.

9. A one-piece filter element blank according to claim 7, provided with sealing strips integral with said blank along both said free edges.

10. A pyramid-shaped filter element according to claim 3, consisting of a one-piece blank of filter material composed of four equilateral triangles of identical size with a corner of each triangle meeting at one point so that said blank had two free edges meeting at said point, said blank being folded along lines extending from said point to the other corners of said triangles into a pyramid-shaped filter element with said free edges abutting against each other; and means for connecting said two abutting free edges to each other so as to maintain said blank in folded condition.

* * * * *